United States Patent
Xu et al.

(10) Patent No.: US 9,703,386 B2
(45) Date of Patent: Jul. 11, 2017

(54) METHOD FOR CONTROLLING TERMINAL DEVICE BY USING HEADSET WIRE AND THE TERMINAL DEVICE THEREOF

(71) Applicant: Xiaomi Inc., Beijing (CN)

(72) Inventors: Bing Xu, Shenzhen (CN); Zhijie Li, Beijing (CN); Kai Xiao, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 199 days.

(21) Appl. No.: 14/525,174

(22) Filed: Oct. 27, 2014

(65) Prior Publication Data

US 2015/0123763 A1    May 7, 2015

Related U.S. Application Data

(63) Continuation of application No. PCT/CN2014/076982, filed on May 7, 2014.

(30) Foreign Application Priority Data

Nov. 5, 2013   (CN) .......................... 2013 1 0542831

(51) Int. Cl.
  *G08B 6/00*   (2006.01)
  *G06F 3/01*   (2006.01)
  (Continued)

(52) U.S. Cl.
  CPC .............. *G06F 3/017* (2013.01); *G06F 3/021* (2013.01); *G06F 3/03* (2013.01); *G08C 19/00* (2013.01);
  (Continued)

(58) Field of Classification Search
  CPC ........ G06F 3/0213; G06F 3/021; G06F 3/017; G06F 2203/04808
  (Continued)

(56) References Cited

U.S. PATENT DOCUMENTS 8,094,673 B2    1/2012  Proctor et al.
2007/0131445 A1   6/2007  Gustavsson
(Continued)

FOREIGN PATENT DOCUMENTS

CN   101615409 A   12/2009
CN   101742372 A    6/2010
(Continued)

OTHER PUBLICATIONS

"European Search Report for 14177737.5-1910".
"International Search Report for PCT/CN2014/076982".

*Primary Examiner* — Carlos E Garcia
(74) *Attorney, Agent, or Firm* — Jun He Law Offices P.C.; James J. Zhu

(57) ABSTRACT

The present disclosure provides a method for controlling a terminal device by using a headset wire connected to the terminal device. The method includes: recognizing a user's gesture based on a current detected in a specific region of the headset wire; acquiring control instruction corresponding to the user's gesture; and executing the control instruction. According to the present disclosure, when a current is detected in the specific region of the headset wire, a user's gesture is recognized based on the current, control instruction corresponding to the user's gesture is acquired, and the control instruction is executed to control the terminal. In the whole procedure, the user only needs to touch the specific region of the headset wire without using pressure button to produce current signal, thereby the operation of controlling the terminal device is convenient and fast.

14 Claims, 6 Drawing Sheets

(51) Int. Cl.
*G06F 3/03* (2006.01)
*G06F 3/02* (2006.01)
*G08C 19/00* (2006.01)

(52) U.S. Cl.
CPC .............. *G06F 2203/04808* (2013.01); *G08C 2201/32* (2013.01)

(58) Field of Classification Search
USPC ............................................ 340/407.2, 5.51
See application file for complete search history.

(56) References Cited

U.S. PATENT DOCUMENTS

| | | | | |
|---|---|---|---|---|
| 2007/0291009 | A1* | 12/2007 | Wright | G06F 3/044 345/173 |
| 2010/0017710 | A1* | 1/2010 | Kim | G06F 3/0414 715/702 |
| 2010/0295709 | A1* | 11/2010 | Wu | G01D 5/24 341/15 |
| 2011/0148804 | A1* | 6/2011 | Yeh | G06F 3/038 345/174 |
| 2011/0285554 | A1 | 11/2011 | Aghaei et al. | |
| 2011/0298724 | A1* | 12/2011 | Ameling | G06F 3/04883 345/173 |
| 2011/0316611 | A1 | 12/2011 | Gustavsson | |
| 2012/0194445 | A1* | 8/2012 | Chang | G06F 3/0416 345/173 |
| 2013/0002601 | A1 | 1/2013 | McCracken | |
| 2013/0021737 | A1* | 1/2013 | Kokuryu | H04W 52/0264 361/679.26 |
| 2013/0102361 | A1 | 4/2013 | Colley et al. | |
| 2013/0167084 | A1* | 6/2013 | Miyake | G06F 3/0482 715/810 |
| 2014/0078091 | A1* | 3/2014 | Lu | G06F 1/1692 345/173 |
| 2014/0160049 | A1* | 6/2014 | Shin | G06F 3/0486 345/173 |
| 2014/0285455 | A1* | 9/2014 | Jiang | G06F 3/017 345/173 |
| 2015/0138122 | A1* | 5/2015 | Cho | G09G 3/3406 345/173 |
| 2015/0363026 | A1* | 12/2015 | Hu | G08C 17/02 340/12.55 |
| 2016/0170538 | A1* | 6/2016 | Wang | G06F 3/0412 345/173 |

FOREIGN PATENT DOCUMENTS

| | | |
|---|---|---|
| CN | 101907959 A | 12/2010 |
| CN | 101931694 A | 12/2010 |
| CN | 202019377 U | 10/2011 |
| CN | 102547511 A | 7/2012 |
| CN | 102841720 A | 12/2012 |
| CN | 103576578 A | 2/2014 |
| EP | 2388787 A1 | 11/2011 |
| JP | 07-114621 A | 2/1995 |
| JP | 2004-333302 A | 11/2004 |
| JP | 3139467 U | 2/2008 |
| JP | 2010-015204 A | 1/2010 |
| JP | 2010-258623 A | 11/2010 |
| JP | 2013-200712 A | 10/2013 |
| JP | 2014029565 A | 2/2014 |
| RU | 2367105 C1 | 9/2009 |
| RU | 2008121272 A | 12/2009 |
| TW | 200952509 A | 12/2009 |

* cited by examiner

US 9,703,386 B2

METHOD FOR CONTROLLING TERMINAL DEVICE BY USING HEADSET WIRE AND THE TERMINAL DEVICE THEREOF

CROSS REFERENCE TO RELATED APPLICATION

This application is a Continuation of International Application No. PCT/CN2014/076982, filed May 7, 2014, which is based upon and claims priority to Chinese Patent Application No. 201310542831.7, filed on Nov. 5, 2013, the entire contents of which are incorporated herein by reference.

TECHNICAL FIELD

The present disclosure relates to a field of terminal device, and more particularly, to a method for controlling a terminal device by using a headset wire and the terminal device thereof.

BACKGROUND

As terminal devices become popular, application programs such as music, video, and radio applications installed in the terminal devices are becoming increasingly diverse. In order to avoid disturbing other persons when these application programs are in use, lots of users prefer wearing a headset or earphone to listen to the audio from the terminal device. Moreover, when wearing a headset to listen to the audio, the user may release his/her hands to cope with other matters, so that the user's time may be saved.

Generally, a headset may include at least one headset wire, where a plug may electrically connect to one end of the headset wire and a speaker may electrically connect to the other end of the headset wire. The headset wire may include a positive wire, a negative wire, a protection layer wrapped the positive and negative wire, and a wire control button. The positive and negative wires are made of high-conductivity metal material, such as copper or aluminum. Since the high-conductivity metal material such as copper or aluminum have lower flexibility, the positive and negative wires wrapped in the protection layer may break due to external pulling force or self-weight and repetitive winding during the use of the headset wire. Besides, the sensitivity of the wire-control button may easily decrease or the wire control button may easily malfunction due to frequent pressing. Thereby, the headset's performance will be decreased with an increased maintenance cost and a shortened lifespan.

SUMMARY

Accordingly, the present disclosure provides a method for controlling a terminal device by using a headset wire and the terminal device thereof to improve the headset wire's performance and elongate the headset wire's lifespan.

According to a first aspect of embodiments of the present disclosure, there is provided a method for controlling a terminal device by using a headset wire connected to the terminal device, the method comprising: recognizing a user's gesture based on a current detected in a specific region of the headset wire; acquiring control instruction corresponding to the user's gesture; and executing the control instruction.

According to a second aspect of embodiments of the present disclosure, there is provided a terminal device, comprising: an audio interface unit for connecting a headset wire to the terminal device; a processor; and a memory for storing instructions executable by the processor, wherein the processor is configured to execute instructions for: recognizing a user's gesture based on a current detected in a specific region of the headset wire; acquiring control instruction corresponding to the user's gesture; and executing the control instruction.

According to a third aspect of embodiments of the present disclosure, there is provided a non-transitory readable storage medium including instructions, executable by a processor in a terminal device, for performing the method for controlling the terminal device by using a headset wire connected to the terminal device, the method comprising: recognizing a user's gesture based on a current detected in a specific region of the headset wire; acquiring control instruction corresponding to the user's gesture; and executing the control instruction.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

One of the core concepts of the present disclosure is to provide a headset wire which has a specific region made of capacitance material to control a terminal device in case that the headset wire is connected with the terminal device. When a current formed by the user's contact with the specific region of the headset wire is detected in the specific region, a user's gesture is recognized based on the current. Moreover, a control instruction corresponding to the user's gesture is acquired by the terminal device, and the control instruction is executed so as to realize controlling of the terminal device.

Figure 1A:
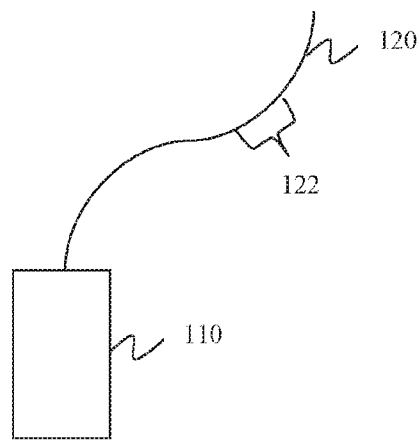
FIG. 1A is a schematic graph illustrating a system including a terminal device and a headset wire connected to the terminal device.

In FIG. 1A, a system 100 includes a terminal device 110 and a headset wire 120. The terminal device 110 may be, for example but not limited to, a smart phone. The headset wire 120 is connected to the terminal device 110. Further, the headset wire 120 includes a specific region 122 for receiving the user's gesture. The specific region 122 is made of some special material to generate current when the user interacts with the specific region. For example, the specific region 122 is made of capacitance material. For purpose of clarity, the following description assumes that the specific region 122 is made of capacitance material, but those of skill in the art will recognize that the techniques described herein also support other materials than capacitance material.

Figure 1B:
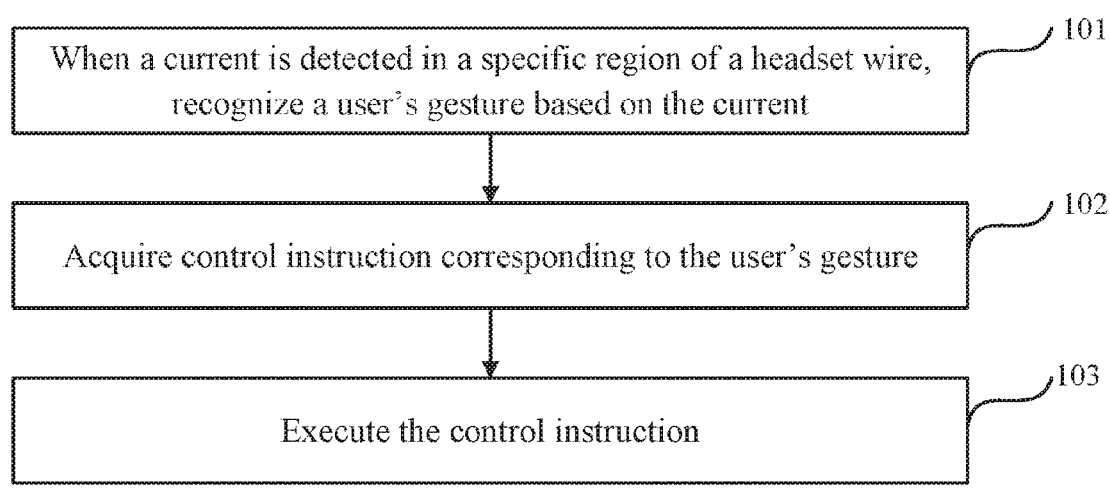
FIG. 1B is a flow chart collectively illustrating a method for controlling a terminal device by using a headset wire, according to an exemplary embodiment of the present disclosure.

Referring to FIG. 1B, which is a flow chart collectively illustrating a method for controlling a terminal device by using a headset wire according to an exemplary embodiment of the present disclosure. The present embodiment may include the following steps.

In step 101, when a current is detected in the specific region of the headset wire, a user's gesture is recognized based on the current.

In step 102, control instruction corresponding to the user's gesture is acquired.

In step 103, the control instruction is executed.

The present embodiment provides a headset wire which has a specific region made of capacitance material to control a terminal device. Since the capacitance material possesses better material performance in terms of optical loss and power consumption of terminal device system than resistance materials, the performance of the headset wire is improved. Besides, the capacitance material has resistance against wear and has a long lifespan, so the maintenance cost is low during user's use.

When a current is detected in the specific region, a user's gesture is recognized based on the current, control instruction corresponding to the user's gesture is acquired, and the control instruction is executed so as to realize controlling of the terminal device. In the whole procedure, the user only needs to touch the specific region of the headset wire, but doesn't need to use a pressure button in the headset wire to produce a current signal, thereby the operation of controlling the terminal device is convenient and fast.

Figure 2:
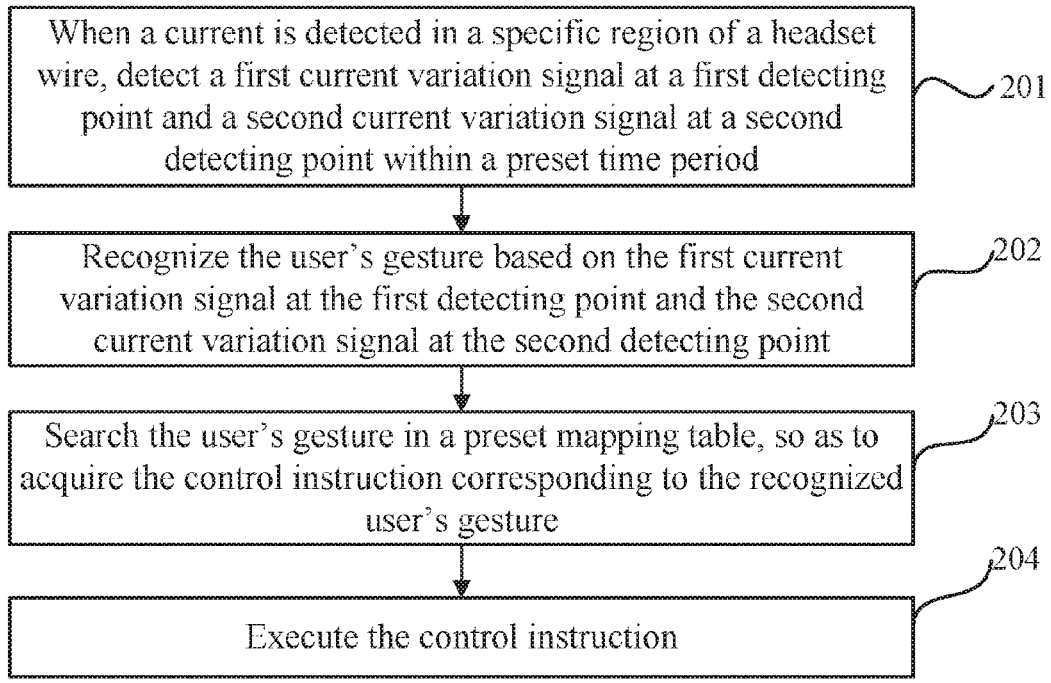
FIG. 2 is a flow chart illustrating an example of a method for controlling a terminal device by using a headset wire, according to an exemplary embodiment of the present disclosure.

Referring to FIG. 2, which is a flow chart illustrating an example of a method for controlling a terminal device by using a headset wire according to an exemplary embodiment of the present disclosure. The headset wire connected to the terminal device includes a specific region, wherein the specific region includes a first detecting point and second detecting point and a distance between the first detecting point and the second detecting point is larger than a preset distance threshold value. The present embodiment may include the following steps.

In step 201, when the current is detected in the specific region of the headset wire, a first current variation signal at the first detecting point and a second current variation signal at the second detecting point within a preset time period are detected.

In this case, the current detected in the specific region of the headset wire is generated by the user's contact with the specific region, and the user may contact with the specific region of the headset wire through fingers or other touch tool that can be sensed by the capacitance material, such as touch pens and touch gloves. In the present embodiment, since the specific region of the headset wire is made of capacitance material, when the user contacts with the specific region of the headset wire, his/her human body and a wire surface of the specific region will form a coupling capacitance there between because of the human body's electrical field. For a high frequency capacitance, the capacitance functions as a direct conductor, hence the finger which is contacting with the specific region attracts a part of tiny current from the contact point. The variation of this part of tiny current may be detected by a detecting circuit located on a mainboard of the terminal device. The detecting circuit may be an ADC (Analog-to-Digital Converter) circuit. Usually, there are a multiple of ADC interface units included in the mainboard or system board of the general terminal device system. If the ADC interface units in the terminal device system are not sufficient to act as the detecting circuit, a single-chip may be additionally added to the interface circuits of the terminal device and ADC interface units on the single-chip may be used to be used as the detecting circuit.

In the present embodiment, two detecting points (the first detecting point and the second detecting point) may be preset in the specific region of the headset wire. Two detecting circuits are employed to constantly measure current variation conditions of the two detecting points within a preset time period, so as to obtain current variation signals thereof. Meanwhile, the two preset detecting points on the headset wire may be marked with specific markers, such as being marked with specific colors, so as to facilitate the user to perform control gestures accurately when using the headset wire.

It is to be noted that, in the present embodiment, the specific region of the headset wire may be the entire region of the headset wire, or may be a partial region of the headset wire. Moreover, the first detecting point and the second detecting point are two points which are arbitrarily selected in the specific region provided the distance between which is larger than a preset distance threshold value. In the present embodiment, there are no limitations on how to select the specific region of the headset wire and on how to select the first detecting point and the second detecting point.

In step 202, the user's gesture is recognized based on the first current variation signal at the first detecting point and the second current variation signal at the second detecting point.

In an implementation of the present embodiment, the user's gesture may include a sliding gesture. Accordingly, the present embodiment further provides the following sub steps to recognize the sliding gesture performed by the user.

In sub step S11, if the first current variation signal at the first detecting point becomes larger and the second current variation signal at the second detecting point becomes smaller, the user's gesture is recognized as a sliding gesture in a direction from the second detecting point to the first detecting point.

In sub step S12, if the first current variation signal at the first detecting point becomes smaller and the second current variation signal at the second detecting point becomes larger, the user's gesture is recognized as a sliding gesture in a direction from the first detecting point to the second detecting point.

Figure 3:
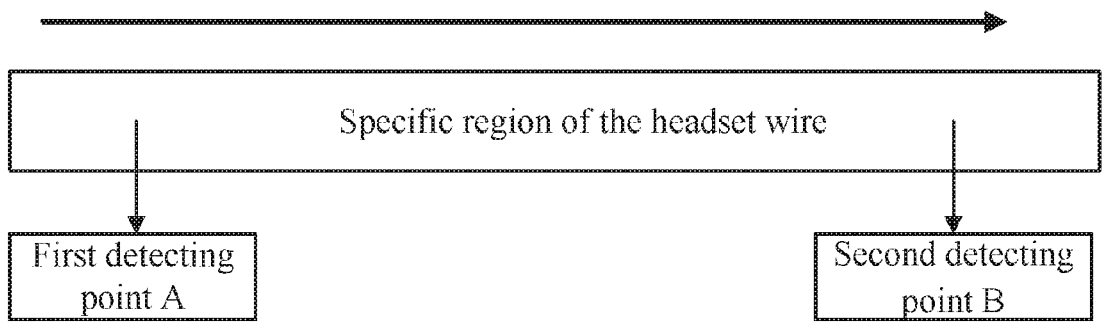
FIG. 3 is a diagram illustrating user's operation in a method for controlling a terminal device by using a headset wire, according to an exemplary embodiment of the present disclosure.

In this case, because the value of Current may be calculated by the function "Current=Voltage/Resistance" and the value of Resistance may be calculated by the function "Resistance=(Resistivity*Lead Length)/Cross Section Area", the value of Current is equal to the result of "Cross Section Area*Voltage/(Resistivity*Lead Length)". It can be known that the magnitude of current is in inverse proportion to the lead length. Referring to the user's operation diagram as shown in FIG. 3, the first detecting point A and the second detecting point B are specified in the specific region of the headset wire, and the position of point A is to the left of the position of point B. In a preset time period, when it is detected that the first current variation signal at point A becomes smaller and the second current variation signal at point B becomes larger, it means that the user's contact point on the headset wire is becoming more and more farther from point A, and becoming more and more nearer from point B, so it can be known that the user's gesture is a sliding gesture away from point A and approaching to point B. Accordingly, the sliding direction is determined as from point A to point B (or from left to right). Accordingly, in a preset time period, when it is detected that the first current variation signal at point A becomes larger and the second current variation signal at point B becomes smaller, it means that the user's contact point on the headset wire is becoming more and more nearer from point A, and becoming more and more farther from point B, so it can be known that the user's gesture is a sliding gesture away from point B and approaching to point A. In other words, the sliding direction is from point B to point A (or from right to left).

In another implementation of the present embodiment, the user's gesture may include a tap gesture, the recognizing manner of which may include the following sub steps.

In sub step S21, if the first current variation signal at the first detecting point and/or the second current variation signal at the second detecting point keep constant, and the duration in which the first or second current variation signal keeps constant is larger than a preset threshold value, the user's gesture is recognized as a tap gesture with a tapping period larger than the preset threshold value.

In sub step S22, if the first current variation signal at the first detecting point and/or the second current variation signal at the second detecting point keeps constant, and the duration in which the first or second current variation signal keeps constant is smaller than or equal to a preset threshold value, the user's gesture is recognized as a tap gesture with a tapping period smaller than or equal to the preset threshold value.

In FIG. 3, when the first current variation signal at point A keeps constant, and/or the second current variation signal at point B keeps constant, it means that the distance between the user's contact point on the headset wire and point A as well as the distance between the user's contact point on the headset wire and point B are not changed, so it can be known that the user's gesture is a tap gesture which is stationary on a certain contact point.

Further, the tap gesture may be classified into a tap gesture with a tapping period larger than the preset threshold value and a tap gesture with a tapping period smaller than or equal to the preset threshold value by calculating the duration in which the tap gesture of the user is stationary on a certain contact point.

In step 203, the recognized user's gesture is searched in a preset mapping table, so as to acquire the control instruction corresponding to the recognized user's gesture.

In the present embodiment, a mapping table may be preset to store mapping relationships between control instructions and user's gestures, and the control instruction corresponding to the user's gesture may be acquired by searching the mapping table. In an implementation of the present embodiment, the control instructions may include an instruction to increase/decrease volume, an instruction to pause/play one single audio or video item, an instruction to open/close a multimedia application program, and etc.

For example, the preset mapping table prescribing mapping relations between user's gestures and control instructions in the present embodiment is shown in Table 1:

TABLE 1

| User's gesture | Control instruction |
| --- | --- |
| Sliding gesture from left to right | Instruction to decrease volume |
| Sliding gesture from right to left | Instruction to increase volume |
| Tap gesture with a tapping period larger than the preset threshold value | Instruction to open/close a multimedia application program |
| Tap gesture whose tapping period is smaller than or equal to the preset threshold value | Instruction to pause/play one single audio or video item |

It can be queried from the mapping table as shown in Table 1 that, if the second detecting point is located to the right of the first detecting point, then the control instruction corresponding to the sliding gesture in the direction from the second detecting point to the first detecting point is the instruction to increase volume, and the control instruction corresponding to the sliding gesture in the direction from the first detecting point to the second detecting point represents the instruction to decrease volume. Moreover, in this example, the control instruction corresponding to the tap gesture with a tapping period larger than the preset threshold value is the instruction to close/open corresponding application program; and the control instruction corresponding to the tap gesture with a tapping period smaller than or equal to the preset threshold value is the instruction to pause/play corresponding audio or video.

In step 204, the control instruction is executed.

By querying the above mapping table, the control instruction corresponding to each of the recognized user's gestures may be obtained. It is to be noted that, the above mapping table is only for purpose of clarity, therefore those of skill in the art will understand that the control instruction may be defined as different instructions according to different current application scenarios. For example, if the current application scenario is that the user is opening a music play application program, then the control instruction may be the instruction to increase or decrease the current volume. Besides, control instructions such as the instruction to pause/play one single audio or video item of an application program and the instruction to open/close the application program can also vary with different application scenarios. For example, when the acquired corresponding control instruction is the instruction to pause/play one single audio or video item, if the current playback state of the audio or video item is a paused state, then the control instruction is the instruction to play corresponding audio or video item.

Alternatively, if the current playback state of the audio or video item is a playing state, then the control instruction represents the instruction to pause the corresponding audio or video item. Similarly, as for the instruction to open/close the application program, if the current switching state of the application program is an open state, then the control instruction is the instruction to close the corresponding application program. Alternatively, if the current playback state of the application program is a closed state, then the control instruction represents the instruction to open the corresponding application program. According to the control instructions, the one or more processors of the terminal device may perform operations instructed by the control instructions identified in the terminal device, so as to control the terminal device to perform a variety of operations.

It is to be noted that, the above user's gestures and control instructions are merely examples of the present embodiment. As actually needed, those skilled in the art may define other types of user's gestures and control instructions according to the conception of the present embodiment (e.g., adding an instruction to zoom in or zoom out pictures). The present embodiment has no limitations thereto.

In the present embodiment, the user's gesture acting on the specific region of the headset wire can be determined just by arbitrarily setting two detecting points in the specific region, then control instruction corresponding to the user's gesture is acquired to realize controlling of the terminal device to perform a variety of operations, thereby the efficiency of current detection is improved, so that the efficiency of controlling the terminal device in response to the user's gesture is further improved.

Figure 4:
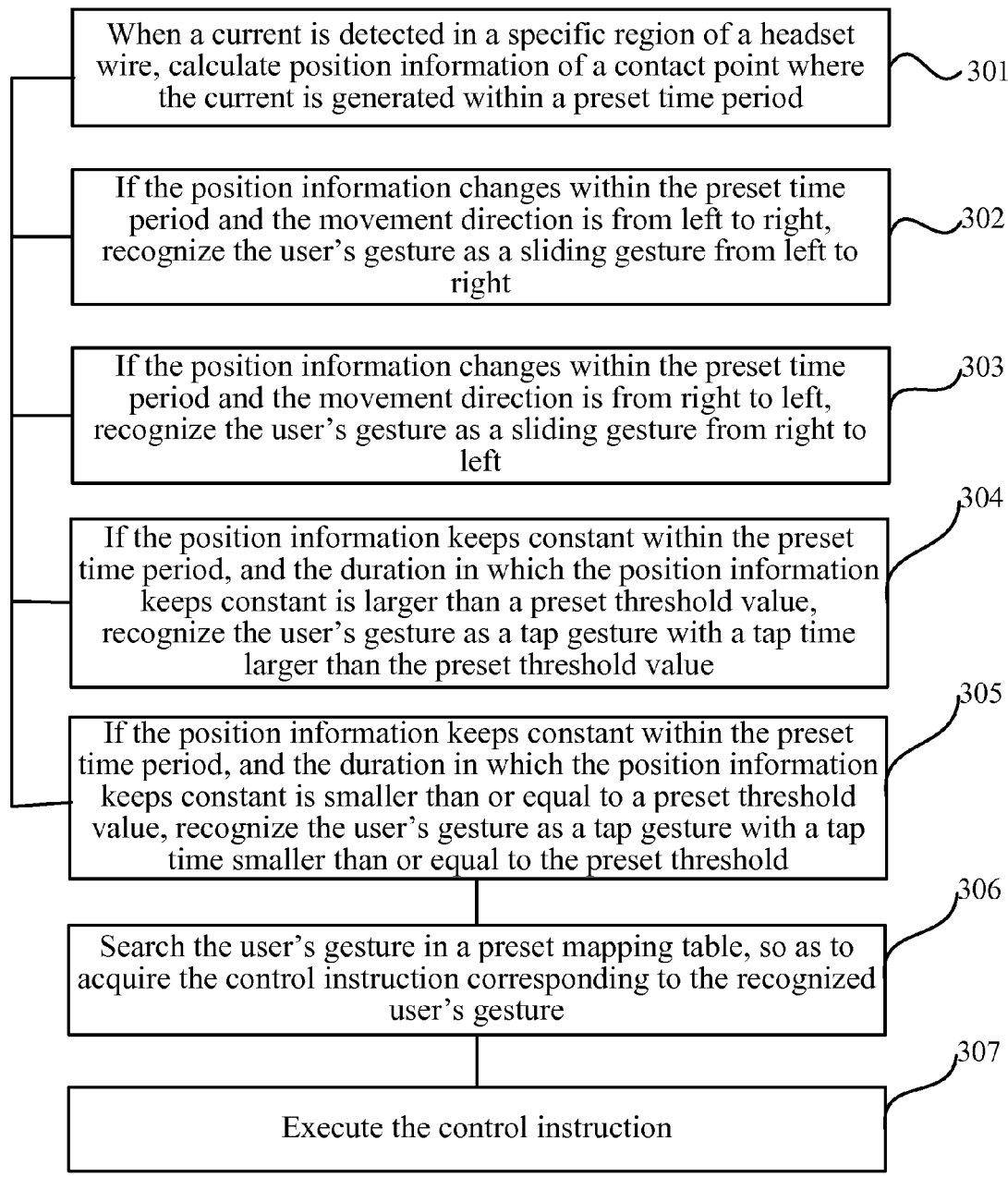
FIG. 4 is a flow chart illustrating another example of a method for controlling a terminal device by using a headset wire, according to an exemplary embodiment of the present disclosure.

Referring to FIG. 4, which is a flow chart illustrating another example of a method for controlling a terminal device by using a headset wire according to an exemplary embodiment of the present disclosure. The present embodiment may include the following steps.

In step 301, when the current is detected in the specific region of the headset wire, position information of a contact point where the current is generated within a preset time period is calculated.

In the present embodiment, since the specific region of the headset wire is made of capacitance material, when the user contacts with the specific region of the headset wire, his/her human body and a wire surface of the specific region will form a coupling capacitance there between because of human body's electrical field. For a high frequency capacitance, the capacitance functions as a direct conductor, hence the finger which is contacting with the specific region attracts a part of tiny current from the contact point. This current respectively flows out from electrodes on four corners of the capacitance material, and the currents flowing through the four electrodes are respectively in direct proportion to distances from the finger to the four corners. The position of the contact point where the current is generated can be obtained by accurately calculating the ratio of the four currents. The user's contact with the specific region may be sensed by a detecting circuit such as an ADC circuit described above, and the current formed by the contact may be detected, so that the position of the contact point may be calculated based on the current.

In step 302, if the position information change within the preset time period and the movement direction determined by the change of the position information is from left to right, the user's gesture is recognized as a sliding gesture from left to right.

In step 303, if the position information change within the preset time period and the movement direction determined by the change of the position information is from right to left, the user's gesture is recognized as a sliding gesture from right to left.

In realization, the detecting circuit may detect the currents to calculate the position information of all the contact points formed between the user and the specific region of the headset wire. If the position information changes, it means that there are a plurality of contact points, that is, the user's gesture is recognized as a sliding gesture. By means of a contact point trajectory formed by the position information of all the contact points, information of movement direction of the sliding gesture may be obtained, e.g., from left to right, or from right to left, etc.

In step 304, if the position information keeps constant within the preset time period, and the duration in which the position information keeps constant is larger than a preset threshold value, the user's gesture is recognized as a tap gesture with a tapping period larger than the preset threshold value.

In step 305, if the position information keeps constant within the preset time period, and the duration in which the position information keeps constant is smaller than or equal to a preset threshold value, the user's gesture is recognized as a tap gesture whose tapping period is smaller than or equal to the preset threshold value.

Accordingly, if the position information keeps constant, it means that there is only one contact point between the user and the specific region. The user's gesture is a tap gesture, and the duration of the tap gesture is acquired by detecting the duration in which the position information keeps constant.

In step 306, the recognized user's gesture is searched in a preset mapping table prescribing mapping relations between gestures and control instructions, so as to acquire the control instruction corresponding to the recognized user's gesture. Then, the step 307 is performed.

In step 307, the control instruction is executed.

By querying the above mapping table, the control instruction corresponding to each of the recognized user's gestures may be obtained, so as to control the terminal device by executing the control instruction.

In the present embodiment, the specific region of the headset wire is made of capacitance material, the position information of each contact point is acquired by sensing the user's contact point on the specific region, the user's gesture acting on the specific region of the headset wire can be recognized based on the position information of the contact point, then control instruction corresponding to the user's gesture is acquired to realize controlling of the terminal device, thereby the accuracy of user's gesture recognition is improved, so as to accurately control the terminal device.

Figure 5:
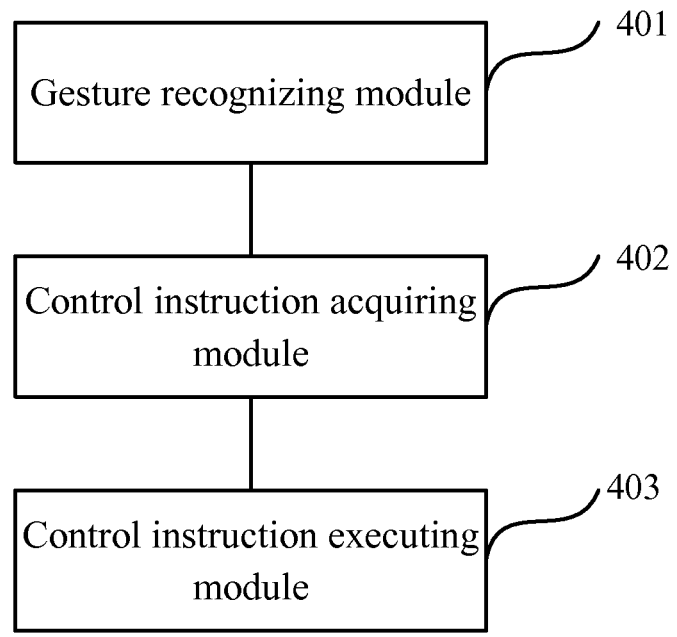
FIG. 5 is a block diagram illustrating an apparatus for controlling a terminal device by using a headset wire, according to an exemplary embodiment of the present disclosure.

Based on the same inventive concept, referring to FIG. 5, which is a block diagram illustrating an apparatus for controlling a terminal device by using a headset wire connected to the terminal device according to an exemplary embodiment of the present disclosure and the device may include the following modules. In this exemplary embodiment, the headset wire has a specific region made of capacitance material.

In a gesture recognizing module 401, when a current is detected in the specific region of the headset wire, a user's gesture is recognized based on the current.

In a control instruction acquiring module 402, a control instruction corresponding to the user's gesture is acquired.

In a control instruction executing module 403, the control instruction is executed.

Figure 6:
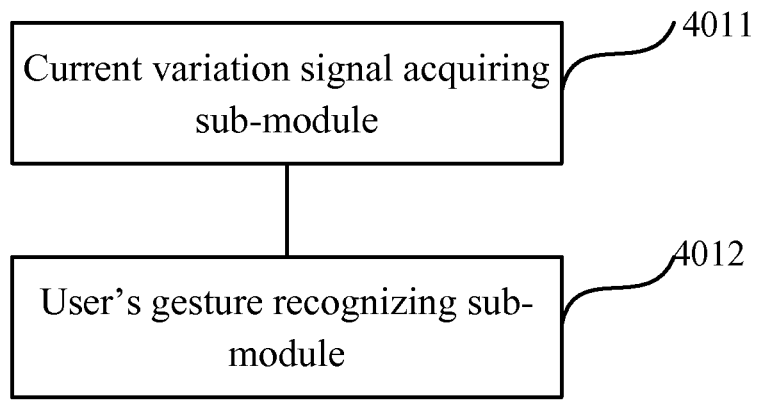
FIG. 6 is a block diagram illustrating a gesture recognizing module, according to an exemplary embodiment of the present disclosure.

Referring to FIG. 6, which is a block diagram illustrating a gesture recognizing module according to an exemplary embodiment of the present disclosure, the specific region of the headset wire includes a first detecting point and second detecting point, and a distance between the first detecting point and the second detecting point is larger than a preset distance threshold value. The gesture recognizing module 401 may include the following sub-modules.

In a current variation signal acquiring sub-module 4011, when the current is detected in the specific region of the headset wire, a first current variation signal at the first detecting point and a second current variation signal at the second detecting point within a preset time period are detected.

In a user's gesture recognizing sub-module 4012, the user's gesture is recognized based on the first current variation signal at the first detecting point and the second current variation signal at the second detecting point.

In an implementation of the present embodiment, the user's gesture recognizing sub-module 4012 may include the following units.

In a first gesture determining unit, when the first current variation signal at the first detecting point becomes larger and the second current variation signal at the second detecting point becomes smaller, the user's gesture is recognized as a sliding gesture in a direction from the second detecting point to the first detecting point.

In a second gesture determining unit, when the first current variation signal at the first detecting point becomes smaller and the second current variation signal at the second detecting point becomes larger, the user's gesture is recognized as a sliding gesture in a direction from the first detecting point to the second detecting point.

In an implementation of the present embodiment, the user's gesture recognizing sub-module 4012 may include the following units.

In a third gesture determining unit, when the first current variation signal at the first detecting point and/or the second current variation signal at the second detecting point keeps constant, and the duration in which the first or second current variation signal keeps constant is larger than a preset threshold value, the user's gesture is recognized as a tap gesture whose tapping period is larger than the preset threshold value.

In a fourth gesture determining unit, when the first current variation signal at the first detecting point and/or the second current variation signal at the second detecting point keeps constant, and the duration in which the first or second current variation signal keeps constant is smaller than or equal to a preset threshold value, the user's gesture is recognized as a tap gesture with a tapping period smaller than or equal to the preset threshold value.

Figure 7:
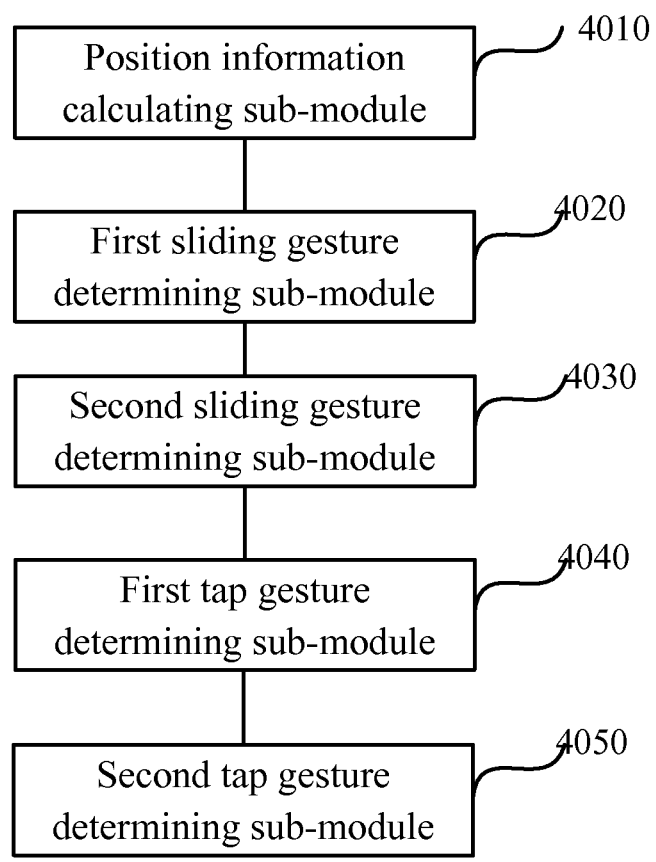
FIG. 7 is a block diagram illustrating a gesture recognizing sub-module, according to an exemplary embodiment of the present disclosure.

Referring to FIG. 7, which is a block diagram illustrating a gesture recognizing sub-module according to an exemplary embodiment, the user's gesture includes a sliding gesture, and the gesture recognizing module 401 may include the following sub-modules.

In a position information calculating sub-module 4010, when the current is detected in the specific region of the headset wire, position information of a contact point where the current is generated within a preset time period is calculated.

In a first sliding gesture determining sub-module 4020, when the position information changes within the preset time period and the movement direction determined by the change of the position information is from left to right, the user's gesture is recognized as a sliding gesture from left to right.

In a second sliding gesture determining sub-module 4030, when the position information changes within the preset time period and the movement direction determined by the change of the position information is from right to left, the user's gesture is recognized as a sliding gesture from right to left.

In a first tap gesture determining sub-module 4040, when the position information keeps constant within the preset time period, and the duration in which the position information keeps constant is larger than a preset threshold value, the user's gesture is recognized as a tap gesture whose tapping period is larger than the preset threshold value.

In a second tap gesture determining sub-module 4050, when the position information keeps constant within the preset time period, and the duration in which the position information keeps constant is smaller than or equal to a preset threshold value, the user's gesture is recognized as a tap gesture whose tapping period is smaller than or equal to the preset threshold value.

In an implementation of the present embodiment, the control instruction acquiring module 402 may include the following sub-module.

A searching sub-module is configured to search the user's gesture in a preset mapping table prescribing mapping relations between gestures and control instructions, so as to acquire the control instruction corresponding to the user's gesture.

Figure 8:
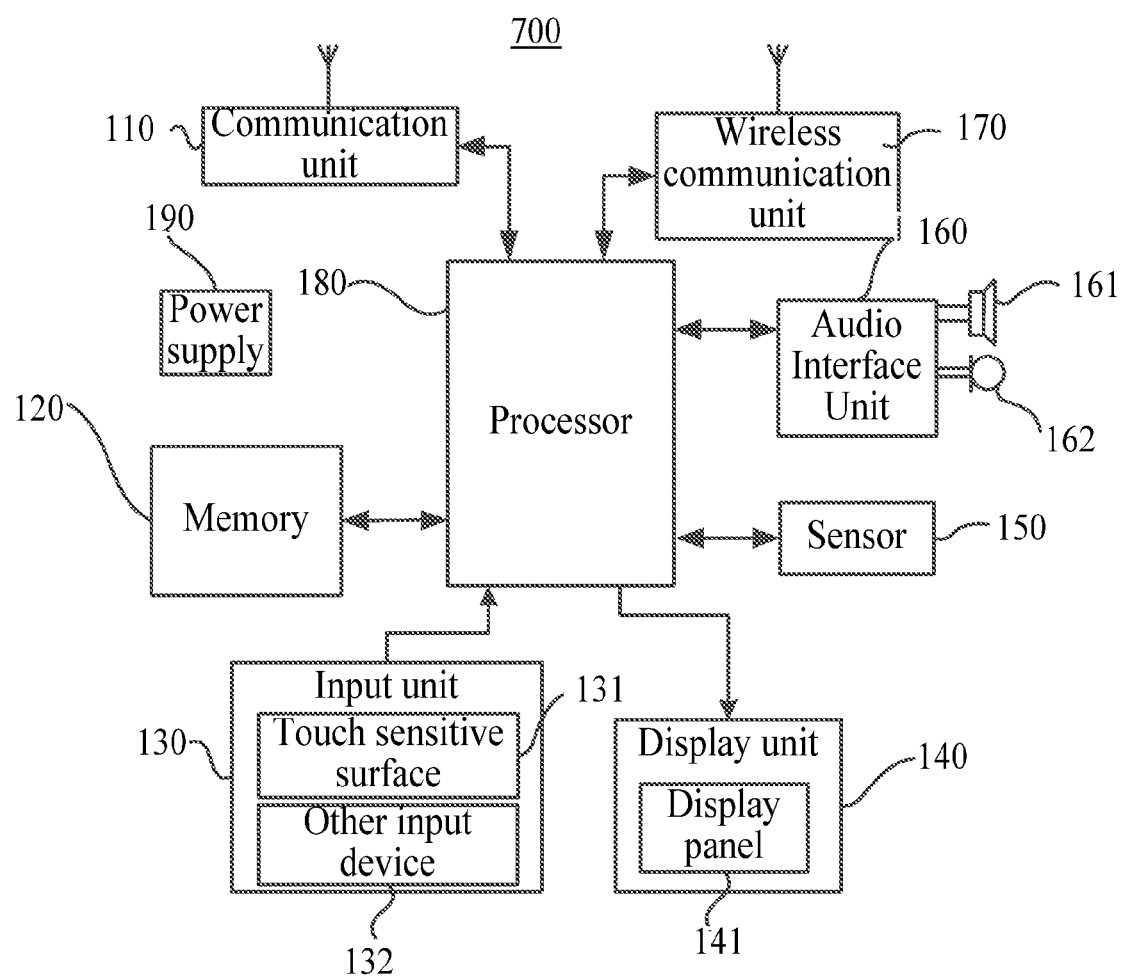
FIG. 8 is a block diagram illustrating a terminal device, according to an exemplary embodiment of the present disclosure.

FIG. 8 is a block diagram illustrating a terminal device according to an exemplary embodiment of the present disclosure. Referring to FIG. 8, the terminal device may be configured to perform the methods provided in the above embodiments, wherein, the terminal device may be a mobile phone, a tablet computer (pad), a wearable mobile equipment (e.g., a smart watch), etc.

The terminal device 700 may include a communication unit 110, a memory 120 including one or more computer-readable storage media, an input unit 130, a display unit 140, a sensor 150, an audio interface unit 160, a WiFi (Wireless Fidelity) module 170, a processor 180 including one or more processing cores, a power supply 190 and other components. It should be appreciated by those skilled in the art that, the structure of the terminal device shown in FIG. 8 does not constitute a limitation to the terminal device and it may include more or less components than what is illustrated, or combine some of the components, or have different component arrangements.

The communication unit 110 may be configured to transmit and receive information, or to transmit and receive signal during a procedure of calling. The communication unit 110 may be a network communication device such as a RF (Radio Frequency) circuit, a router, and a modem. In particular, when the communication unit 110 is the RF circuit, the communication unit 110 receives downlink information from a base station, and then transfers the information to one or more processors 180 to be processed. Also, the communication unit 110 transmits uplink data to the base station. Generally, the RF circuit as a communication unit includes but not limited to an antenna, at least one amplifier, a tuner, one or more oscillators, a subscriber identity module (SIM) card, a transceiver, a coupler, an LNA (Low Noise Amplifier), a duplexer, etc. Furthermore, the communication unit 110 may communicate with a network and other apparatuses through wireless communication. The wireless communication may use any communication standards or protocols, including but not limited to GSM (Global System of Mobile communication), GPRS (General Packet Radio Service), CDMA (Code Division Multiple Access), WCDMA (Wideband Code Division Multiple Access), LTE (Long Term Evolution), e-mail, SMS (Short Messaging Service), etc. The memory 120 may be configured to store software programs and modules. The processor 180 performs various functional applications and data processing by running the software programs and modules stored in the memory 120. The memory 120 may mainly include a program storage area and a data storage area, wherein the program storage area may store operating systems, application programs required by at least one function (such as a function of sound playback, a function of image playback), etc.; and the data storage area may store data created during operation of the terminal device 700 (such as audio data, phone book), etc. In addition, the memory 120 may include a high-speed random access memory and may also include a non-volatile memory. For example, the memory 120 may include at least one disk storage device, a flash memory device, or other volatile solid-state memory devices. Accordingly, the memory 120 may also include a memory controller to provide access to the memory 120 by the processor 180 and the input unit 130.

The input unit 130 may be configured to receive information of input numbers or characters, and generate input signals of keyboard, mouse, joystick, optical or trackball related to a user setting and the functional control. Optionally, the input unit 130 may include a touch sensitive surface 131 and other input devices 132. The touch sensitive surface 131, also known as a touch screen or a track pad, may collect user's gesture or posture on or near the touch sensitive surface 131 (such as an operation performed by users using any suitable object or accessory such as a finger, a touch pen and the like on or near the touch sensitive surface 131), and drive a corresponding connected device according to a preset program. Optionally, the touch sensitive surface 131 may include two parts of a touch detection device and a touch controller. Here, the touch detection device, detects a signal caused by the gesture or posture, and transmits the signal to the touch controller. The touch controller receives touch information from the touch detection device, transforms it into coordinates of the contact point, and sends the coordinates to the processor 180. The touch controller may also receive a command from the processor 180 and execute the command. In addition, the touch sensitive surface 131 may be realized in various types, such as resistive type, capacitive type, infrared type and surface acoustic wave type. In addition to the touch sensitive surface 131, the input unit 130 may also include other input device 132. Optionally, the other input devices 132 may include but not limited to one or more of a physical keyboard, functional keys (such as volume control keys, switch buttons, etc.), a trackball, a mouse, and a joystick.

The display unit 140 may be configured to display information input by the user or information provided to the user and various graphical user interfaces of the terminal device 700. These graphical user interfaces may consist of graphics, texts, source display frames, videos, and any combination thereof. The display unit 140 may include a display panel 141, and optionally, the display panel 141 may be configured with LCD (Liquid Crystal Display), OLED (Organic Light-Emitting Diode), etc. Further, the touch sensitive surface 131 may cover the display panel 141. When a gesture or posture on or near the touch sensitive surface 131 is detected by the touch sensitive surface 131, the gesture or posture is sent to the processor 180 to determine the type of contact, and then corresponding visual output will be provided on the display panel 141 by the processor 180 according to the type of touch event. Although in FIG. 8, the touch sensitive surface 131 and the display panel 141 are two separate components to realize input and output functions, in some embodiments, the touch sensitive surface 131 and the display panel 141 may be integrated to realize input and output functions.

The terminal device 700 may further include at least one kind of sensor 150, such as a light sensor, a motion sensor and other sensors. Optionally, the light sensor may include an ambient light sensor and a proximity sensor. Here, the ambient light sensor may adjust the brightness of the display panel 141 according to the brightness of the ambient light. The proximity sensor may turn off the display panel 141 and/or backlight when the terminal device 700 moves close to ear. As one kind of the motion sensor, a gravity acceleration sensor may detect the magnitude of acceleration in each direction (typically on three axes), and may detect the magnitude and the direction of gravity when it is stationary, which may be used in the applications for recognizing the attitudes of the mobile phone (such as horizontal and vertical screen switching, related games, attitude calibration of a magnetometer), functions related to vibration recognizing (such as a pedometer, clicking), etc. The terminal device 700 may also be equipped with other sensors such as a gyroscope, a barometer, a hygrometer, a thermometer, and an infrared sensor, which will not be redundantly described herein.

The audio interface unit 160, a speaker 161 and a microphone 162 may provide an audio interface between the user and the terminal device 700. The audio interface unit 160 may transform received audio data into electrical signals which are transmitted to the speaker 161 and transformed into sound signals to be output by the speaker 161. On the other hand, the microphone 162 transforms collected sound signals into electrical signals which are received and transformed into audio data by the audio interface unit 160. After being output to the processor 180 to be processed, the audio data is transmitted to, for example, another terminal device via the RF circuit 110, or output to the memory 120 for further processing. The audio interface unit 160 may also include an ear bud jack to allow a communication between an external headset wire and the terminal device 700. After the headset wire is connected with the terminal device, any gesture executed in the headset wire can be detected and recognized by the terminal device.

In order to achieve wireless communication, the terminal device may be equipped with a wireless communication unit 170 which may be a WiFi module. WiFi is a short-range wireless transmission technology. The terminal device 700 allows the user to send and receive emails, browse webpages and access streaming media, etc. through the wireless communication unit 170, which provides the user with a wireless broadband Internet access. Although FIG. 8 shows the wireless communication unit 170, it should be understood that, the wireless communication unit 170 is not a necessary component of the terminal device 700, and may be omitted as desired without changing the essential scope of the disclosure.

The processor 180 functions as a control center of the terminal device 700 that connects various parts of the entire mobile phone through various interfaces and circuits, performs various functions and data processing of the terminal device 700 by running or executing the software programs and/or modules stored in the memory 120 and by invoking data stored in the memory 120, so as to monitor the overall mobile phone. Optionally, the processor 180 may include one or more processing cores. Optionally, the processor 180 may be integrated with an application processor that mainly processes operating systems, user interfaces and application programs, and a modem processor that mainly processes the wireless communication. It should be understood that, the above modem processor may not be integrated into the processor 180.

The terminal device 700 may also include a power supply 190 (such as a battery) to supply power to each component. Optionally, the power supply may be logically connected to the processor 180 through a power supply management system, so as to achieve the functions such as charge, discharge and power consumption managements, etc. through the power supply management system. The power supply 190 may also include one or more components of a DC or AC power, a recharge system, a power failure detection circuit, a power converter or an inverter, a power status indicator, etc.

Although not shown, the terminal device 700 may also include a camera, a Bluetooth module, etc., which are not redundantly described herein.

In the present embodiment, the display unit of the terminal device is a display with touch screen. The terminal device further includes one or more instruction modules, which are stored in the memory 120 and configured to be executed by the one or more processors 180, wherein, the one or more instruction modules have the following functions: recognizing a user's gesture based on a current detected in a specific region of the headset wire; acquiring control instruction corresponding to the user's gesture; and executing the control instruction. In some exemplary embodiments, terminal device may further include one or more instruction modules further configured to execute steps described in the above FIG. 2 and FIG. 4.

The present embodiment further provides a non-transitory readable storage medium in which one or more instructions modules (programs) are stored. When the one or more instruction modules are applied in an apparatus, the is allowed to execute instructions for the following steps: recognizing a user's gesture based on a current detected in a specific region of the headset wire; acquiring control instruction corresponding to the user's gesture; and executing the control instruction. In some exemplary embodiments, the non-transitory readable storage medium may further include one or more instruction modules further configured to execute steps described in the above FIG. 2 and FIG. 4.

It should be understood by those skilled in the art that, the embodiments of this disclosure may be provided as methods, devices or computer program products. Therefore, the disclosure may adopt embodiments in forms of hardware only, software only, or a combination thereof. Furthermore, the disclosure may adopt forms of computer program products implemented on one or more computer usable storage media (including but not limited to a disk storage, a CD-ROM, an optical storage, etc.) containing computer usable program codes.

The disclosure is described with reference to the flow charts and/or block diagrams of the method, the mobile device (system) and the computer program product according to the disclosure. It should be understood that, each process and/or block in the flow charts and/or block diagrams, and combinations of processes and/or blocks in the flow charts and/or block diagrams, may be realized by computer program instructions. These computer program instructions may be provided to a general-purpose computer, a special-purpose computer, an embedded processor, or processors of other programmable data processing mobile devices, so as to create a machine, such that a device for realizing functions designated in one or more processes in the flow charts and/or in one or more blocks in the block diagrams, may be created by instructions executed by processors of a computer or other programmable data processing mobile devices.

These computer program instructions may also be stored in a computer readable storage that can boot a computer or other programmable data processing mobile devices to work in a specific way, such that a manufactured product containing an instruction device may be created by the instructions stored in the computer readable storage, and the instruction device realizes the functions designated in one or more processes in the flow charts and/or in one or more blocks in the block diagrams.

These computer program instructions may also be loaded into a computer or other programmable data processing mobile devices, such that a series of operating steps may be performed on the computer or other programmable data processing mobile devices, so as to generate processes realized by the computer, such that steps for realizing the functions designated in one or more processes in the flow charts and/or in one or more blocks in the block diagrams may be provided by the instructions executed on the computer or other programmable data processing mobile devices.

The technical solutions provided by the embodiments of the present disclosure may have, in part, the following advantageous effects.

Firstly, in the present disclosure, when a current formed by the user's contact with the specific region of the headset wire is detected in the specific region, a user's gesture is recognized, a control instruction corresponding to the user's gesture is acquired, and the control instruction is executed so as to realize controlling of the terminal device. In the whole procedure, the user only needs to touch the specific region of the headset wire, but doesn't need to use a pressure button to produce a current signal, thereby the operation of controlling the terminal device is convenient and fast.

Secondly, in the present disclosure, the specific region of the headset wire is made of capacitance material, the user's gesture acting on the specific region of the headset wire can be determined by arbitrarily setting two detecting points in the specific region, then the control instruction corresponding to the user's gesture is acquired to realize controlling of the terminal device, thereby the efficiency of current detection is improved, so that the efficiency of controlling the terminal device in response to the user's gesture is further improved.

Thirdly, in the present disclosure, the specific region of the headset wire is made of capacitance material, the position information of each contact point is acquired by sensing the user's contact point on the specific region, the user's gesture acting on the specific region of the headset wire can be obtained based on the position information of the contact point, then the control instruction corresponding to the user's gesture is acquired to realize controlling of the terminal device, thereby the accuracy of user's gesture recognition is improved, so as to accurately control the terminal device.

Although optional embodiments of the present disclosure have been described, these embodiments may be further modified and varied once those skilled in the art know about basic inventive concept. Thus, the appended claims intend to be construed as encompassing optional embodiments and all the modifications and variations that fall within the scope of the disclosure.

Finally, it should be noted that the terms "comprise", "include" or any other variants thereof are intended to cover a non-exclusive inclusion, such that the process, method, product or mobile device including a series of elements not only includes these elements, but also includes other elements not explicitly listed, or other elements inherent in the process, method, product or mobile device. Unless otherwise restricted, the element defined by the statement "comprise a" does not exclude other identical elements which may be further included in the process, method, product or mobile device including the element.

The method and device for controlling a terminal device by using a headset wire and the apparatus and the terminal device thereof according to the present disclosure are introduced in detail as above. Specific examples are used herein for explaining the principle and implementations of the present disclosure. The above description of the embodiments is only used to facilitate understanding to the method of the present disclosure and its essential idea. Meanwhile, those skilled in the art may make various modifications to the specific embodiments and the application scope according to the idea of the present disclosure. In sum, the contents in the present specification should not be construed as limiting the present disclosure.

What is claimed is:

1. A method for controlling a terminal device by using a headset wire connected to the terminal device, the method comprising:
    detecting a current in a specific region of the headset wire, wherein the specific region of the headset wire is made of capacitance material and comprises a first detecting point and a second detecting point, and a distance between the first and second detecting point is larger than a preset distance threshold value;
    detecting a first current variation signal at the first detecting point and a second current variation signal at the second detecting point within a preset time period;
    recognizing the user's gesture as a sliding gesture in a direction from the second detecting point to the first detecting point, if the first current variation signal becomes larger and the second current variation signal becomes smaller;
    acquiring control instruction corresponding to the user's gesture; and
    executing the control instruction.

2. The method of claim 1, wherein recognizing the user's gesture based on the first and second current variation signal comprises:
    recognizing the user's gesture as a tap gesture, if at least one of the first current variation signal and the second current variation signal keeps constant.

3. The method of claim 2, wherein
    the tap gesture is recognized as with a tapping period larger than the preset threshold value if the duration of the current variation signal keeping constant is larger than a preset threshold value; and
    the tap gesture is recognized as with a tapping period smaller than or equal to the preset threshold value if the duration of the current variation signal keeping constant is smaller than or equal to a preset threshold value.

4. The method of claim 1, wherein recognizing the user's gesture based on the current comprises:
    calculating position information of a contact point where the current is generated within a preset time period;
    recognizing the user's gesture as a sliding gesture from left to right, if the position information changes within the preset time period and a movement direction determined by the change of the position information is from left to right; and
    recognizing the user's gesture as a sliding gesture from right to left, if the position information changes within the preset time period and a movement direction determined by the change of the position information is from right to left.

5. The method of claim 1, wherein recognizing the user's gesture based on the current comprises:
    calculating position information of a contact point where the current is generated within a preset time period;
    recognizing the user's gesture as a tap gesture with a tapping period larger than the preset threshold value, if the position information keeps constant within the preset time period and a duration in which the position information keeps constant is larger than a preset threshold value; and
    recognizing the user's gesture as a tap gesture with a tapping period smaller than or equal to the preset threshold value, if the position information keeps constant within the preset time period and a duration in which the position information keeps constant is smaller than or equal to a preset threshold value.

6. The method of claim 1, wherein acquiring the control instruction corresponding to the user's gesture comprises:
    searching the user's gesture in a preset mapping table prescribing mapping relations between gestures and control instructions to acquire the control instruction corresponding to the user's gesture.

7. A terminal device, comprising:
    an audio interface unit for connecting a headset wire to the terminal device;
    a processor; and
    a memory for storing instructions executable by the processor,
    wherein the processor is configured to execute instructions for:
    detecting a current in a specific region of the headset wire, wherein the specific region of the headset wire is made of capacitance material and comprises a first detecting point and a second detecting point, and a distance between the first and second detecting point is larger than a preset distance threshold value;
    detecting a first current variation signal at the first detecting point and a second current variation signal at the second detecting point within a preset time period;
    recognizing the user's gesture as a sliding gesture in a direction from the second detecting point to the first detecting point, if the first current variation signal becomes larger and the second current variation signal becomes smaller;
    acquiring control instruction corresponding to the user's gesture; and
    executing the control instruction.

8. The terminal device of claim 7, wherein recognizing the user's gesture based on the current comprises:
    calculating position information of a contact point where the current is generated within a preset time period;
    recognizing the user's gesture as a sliding gesture from left to right if the position information changes within the preset time period and a movement direction determined by the change of the position information is from left to right; and recognizing the user's gesture as a sliding gesture from right to left, if the position information changes within the preset time period and a movement direction determined by the change of the position information is from right to left.

9. The terminal device of claim 7, recognizing the user's gesture based on the current comprises:
calculating position information of a contact point where the current is generated within a preset time period;
recognizing the user's gesture as a tap gesture with a tapping period larger than the preset threshold value, if the position information keeps constant within the preset time period and a duration in which the position information keeps constant is larger than a preset threshold value; and
recognizing the user's gesture as a tap gesture with a tapping period smaller than or equal to the preset threshold value, if the position information keeps constant within the preset time period and a duration in which the position information keeps constant is smaller than or equal to a preset threshold value.

10. The terminal device of claim 7, wherein the control instruction corresponding to the user's gesture is acquired by searching the user's gesture in a preset mapping table prescribing mapping relations between prescribed gestures and control instructions.

11. A non-transitory readable storage medium including instructions, executable by a processor in a terminal device, for performing a method for controlling the terminal device by using a headset wire connected to the terminal device, the method comprising:
detecting a current in a specific region of the headset wire, wherein the specific region of the headset wire is made of capacitance material and comprises a first detecting point and a second detecting point, and a distance between the first and second detecting point is larger than a preset distance threshold value;
detecting a first current variation signal at the first detecting point and a second current variation signal at the second detecting point within a preset time period;
recognizing the user's gesture as a sliding gesture in a direction from the second detecting point to the first detecting point, if the first current variation signal becomes larger and the second current variation signal becomes smaller;
acquiring control instruction corresponding to the user's gesture; and
executing the control instruction.

12. The storage medium of claim 11, recognizing the user's gesture based on the current comprises:
calculating position information of a contact point where the current is generated within a preset time period;
recognizing the user's gesture as a sliding gesture from left to right if the position information changes within the preset time period and a movement direction determined by the change of the position information is from left to right; and
recognizing the user's gesture as a sliding gesture from right to left, if the position information changes within the preset time period and a movement direction determined by the change of the position information is from right to left.

13. The storage medium of claim 11, recognizing the user's gesture based on the current comprises:
calculating position information of a contact point where the current is generated within a preset time period;
recognizing the user's gesture as a tap gesture with a tapping period larger than the preset threshold value, if the position information keeps constant within the preset time period and a duration in which the position information keeps constant is larger than a preset threshold value; and
recognizing the user's gesture as a tap gesture with a tapping period smaller than or equal to the preset threshold value, if the position information keeps constant within the preset time period and a duration in which the position information keeps constant is smaller than or equal to a preset threshold value.

14. The storage medium of claim 11, wherein the control instruction corresponding to the user's gesture is acquired by searching the user's gesture in a preset mapping table prescribing mapping relations between prescribed gestures and control instruction.

* * * * *